C. D. SCHMIDT.
HOOK.
APPLICATION FILED JUNE 20, 1919.

1,339,004.

Patented May 4, 1920.

INVENTOR
Charles D. Schmidt
BY
Edwards, Sager & Richmond
his ATTORNEYS

UNITED STATES PATENT OFFICE.

CHARLES D. SCHMIDT, OF WOODHAVEN, NEW YORK.

HOOK.

1,339,004.     Specification of Letters Patent.     Patented May 4, 1920.

Application filed June 20, 1919. Serial No. 305,690.

*To all whom it may concern:*

Be it known that I, CHARLES D. SCHMIDT, a citizen of the United States, residing at Woodhaven, Long Island, in the county of Queens and State of New York, have invented certain new and useful Improvements in Hooks, of which the following is a specification.

This invention relates to hooks and particularly to hooks for connecting portions of anti-skid chains for vehicle wheels. The object of the invention is to provide a hook easy in manipulation and secure in its hold and simple and rugged in construction to withstand rough usage.

Further objects and advantages of this invention will appear from the following description taken in connection with the accompanying drawings, in which—

Figure 1:
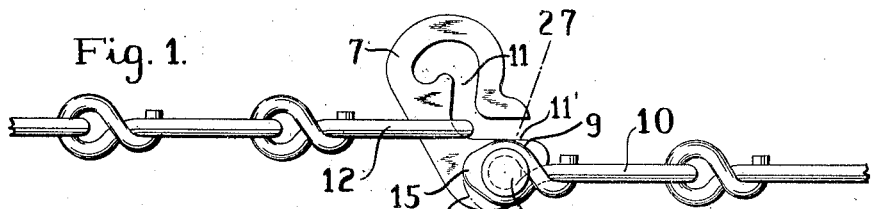
Figure 1 is a view of one embodiment of this invention showing the hook receiving the engaging link.
Figure 2:
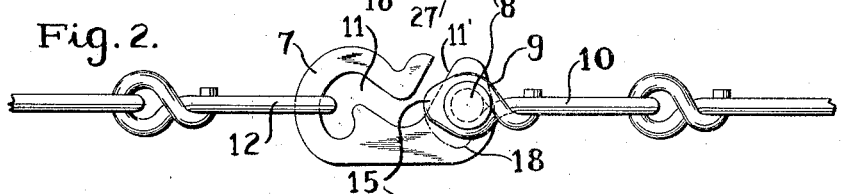
Figs. 2 and 3 are plan and side views respectively of the hook of Fig. 1 in position securing the link.
Figure 4:
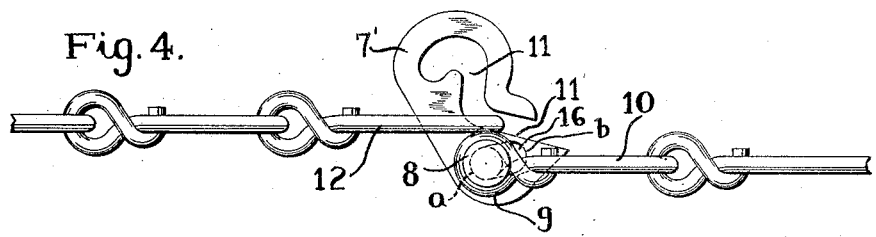
Figure 5:
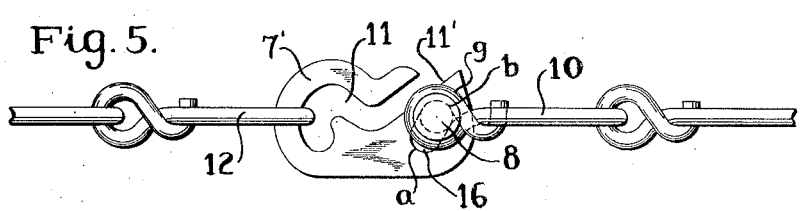
Figure 7:
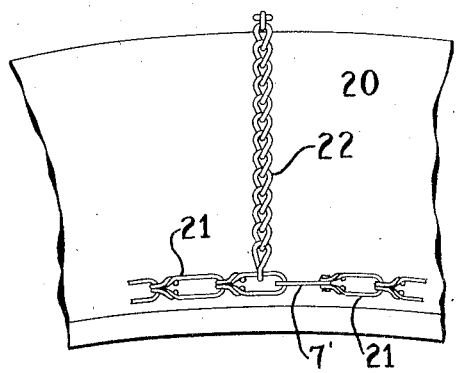
Figure 6:
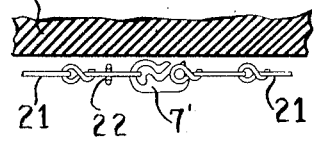

Figs. 4 and 5 are views similar to Figs. 1 and 2 respectively and illustrating a modified form of hook, and Figs. 6 and 7 are sectional and side views respectively of a portion of a wheel provided with a chain and hook of this invention.

In the embodiment of the invention shown in Figs. 1 and 2, a hook 7 is pivoted by rivet 8 between the eyes 9 of link 10 and has an S shaped slot or opening 11 receiving the stock of another or engaged link 12. The slot 11 is opened to receive the link 12 by turning the hook 7 on its pivot to the position shown in Fig. 1 or substantially similar position on the other side of eyes 9, where the inner edge 11' of the slot will be substantially tangent to the outer peripheries of the eyes 9. After the link is engaged in the slot, pivoting of the hook as by pulling to the left on link 12 will close the mouth of slot 11 against the escape of link 12 by the bosses 15 formed by flattening the extreme end surfaces of eyes 9 as shown. The S-shape of the hook slot also aids in retaining hold on the engaged link and it is practically impossible for this link to escape in service.

The bosses 15 instead of being confined to the tip end of eyes 9 may be extended around the link, for instance as indicated in dotted lines 18 in Figs. 1 and 2, so that there will be only one open position of slot 11. If much slack is permissible in the chain this open position will preferably be that shown in Fig. 1. If it is desired to reduce the slack the bosses 15 will be formed to permit the slot to be opened in the position of the hook opposite to that shown in Fig. 1.

In the modification of the invention shown in Figs. 4 and 5, the bosses 15 of eyes 9 are dispensed with and rivet 8 passes through a slot 16 in the hook 7'. This slot is cut on a bias to the edge 11' of hook opening 11 so that when the rivet 8 is in one end $a$ of this slot, the edge 11' will be substantially tangent to the periphery of the link eyes and the hook opening 11 will be free for insertion or removal of the link 12. When, however, rivet 8 is moved to the other end $b$ of slot 16, as by tension to the left on link 12, the eyes 9 overhang and close the hook opening 11 against escape of the link 12, (see Fig. 5).

The hook of this invention does not require any extra parts nor delicate structure. It is simple in form and rugged in service and particularly adapted for use in connection with anti-skid chains for vehicle wheels. A particular instance of such use is illustrated in Figs. 6 and 7 where a tire 20 is provided with chains comprising portions 21 of double eye links and tread or cross portions 22 of twisted links. In attaching this chain to the tire, portions of the chain 21 are connected by a hook 7'. In this combination the hook 7' is kept under tension and secure against loosening and behaves in all respects like a mere link of the chain except to permit fastening and unfastening of the parts.

Figure 3:
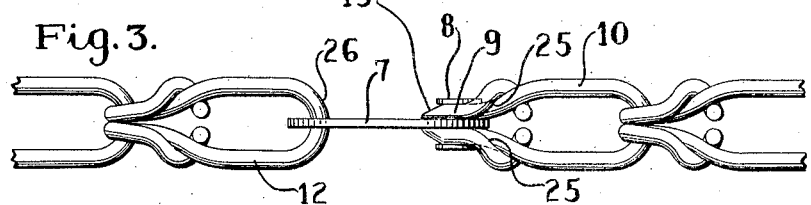

The hook of this invention may be readily attached to standard double eye chain links: with the Fig. 1 hook the link eyes need only be slightly flattened at the end and provided with the connected rivet. The Fig. 4 hook does not even require the link eyes to be flattened but is simply riveted to the hook slot as shown. Therefore, the hook is directly self locking with the standard form of chain link without expensive extra parts or special machining. With the particular form of link shown in Figs. 1 to 5 inclusive the wrapping of the ends of eyes 9 around the link stock so spreads these ends at 25, 25 (Fig. 3), that the convex end 26 of link 12 will at this point fit closer to the center of the rivet 8. The slot 11 of the hook may therefore be so positioned as to have its edge 11' slightly within the outer peripheries of the eyes 9 and still the link will be insertible in the slot in extreme open position of the hook for instance with axis tipped to position of dotted line 27—27 in Fig. 1. Then in extended position of the hook the link will be retained by the peripheries of eyes 9 restricting the opening of slot 11.

I claim:—

1. The combination with a link member, of a hook pivoted thereto and having an opening for attachment to another member, and means whereby pivotal movement of said hook on said link will cause an integral portion of said link to extend over the edge of said opening to prevent escape of said attached member.

2. The combination with a link member having an eye portion, of a hook pivoted to said eye portion and having an opening for attachment to another member, and means whereby pivotal movement of said hook on said link will cause an integral part of said eye portion to extend over the edge of said opening to prevent escape of said attachment member.

3. The combination with a link member, of a hook pivoted thereto and having an S-shaped opening for attachment to another member, and means whereby pivotal movement of said hook on said link will cause an integral portion of said link to extend over the inner edge of said S-shaped opening to prevent escape of said attached member.

4. The combination with a standard double eye link chain, of a hook connected thereto and directly self locking against the escape of the hooked member by the material of the link connected to said hook.

5. The combination with a link member, of attaching means thereon, a hook pivoted to said attaching means and having an opening for attachment to another member, and means whereby pivotal movement of said hook on said link will cause an integral portion of said means to extend over the edge of said opening to prevent escape of said attached member.

6. The combination with a link member, having an eye portion of a hook pivotally connected thereto, and a surface carried by said member concentric with said eye portion, said hook having an open slot adapted to be closed by said surface in one position of said hook relative to said member.

CHARLES D. SCHMIDT.